United States Patent
Wang et al.

(10) Patent No.: US 10,387,923 B2
(45) Date of Patent: Aug. 20, 2019

(54) THIRD PARTY CUSTOMIZED CONTENT BASED ON FIRST PARTY IDENTIFER

(71) Applicant: Google LLC, Mountain View, CA (US)

(72) Inventors: Gang Wang, Frederick, MD (US); Yong Yao, San Jose, CA (US)

(73) Assignee: Google LLC, Mountain View, CA (US)

( * ) Notice: Subject to any disclaimer, the term of this patent is extended or adjusted under 35 U.S.C. 154(b) by 516 days.

(21) Appl. No.: 14/626,031

(22) Filed: Feb. 19, 2015

(65) Prior Publication Data

US 2019/0057420 A1    Feb. 21, 2019

(51) Int. Cl.
*G06Q 30/00* (2012.01)
*G06Q 30/02* (2012.01)
*G06F 21/62* (2013.01)

(52) U.S. Cl.
CPC ......... *G06Q 30/0277* (2013.01); *G06F 21/62* (2013.01); *G06F 21/6254* (2013.01)

(58) Field of Classification Search
USPC ....................................................... 705/14.1
See application file for complete search history.

(56) References Cited

U.S. PATENT DOCUMENTS

| | | | |
|---|---|---|---|
| 7,792,954 B2 * | 9/2010 | Hanson .................. | G06Q 30/02 709/219 |
| 7,904,520 B2 | 3/2011 | Neal et al. | |
| 8,131,861 B2 | 3/2012 | Butler et al. | |
| 8,560,669 B2 | 10/2013 | Sutter et al. | |

(Continued)

FOREIGN PATENT DOCUMENTS

WO    2014/130968    8/2014

OTHER PUBLICATIONS

Anonymous, "Android WebView Cookie Problem," Stackoverflow Questions, Oct. 30, 2009 [retrieved on Jul. 15, 2015]. Retrieved from the Internet: URL<http://stackoverflow.com/questions/1652850/android-webview-cookie-problem>, 5 pages.

(Continued)

*Primary Examiner* — Yehdega Retta
(74) *Attorney, Agent, or Firm* — Fish & Richardson P.C.

(57) ABSTRACT

Methods, systems, and apparatus include computer programs encoded on a computer-readable storage medium for providing content. A method includes: receiving a first request for filling a slot on a first publisher page, the request including an encrypted publisher cookie; providing content responsive to the request; upon receipt of an indication that a user interacted with the content, creating and providing a content serving system cookie; linking the received encrypted publisher cookie with the content serving system cookie; receiving a second, different request for content in association with rendering a second, different publisher page, the second, different request including an encrypted publisher cookie associated with the second different publisher page and the previously provided content serving system cookie; linking the received encrypted publisher cookie associated with the second, different publisher page with the encrypted publisher cookie associated with the first publisher page; and using the linkings to determine content to deliver.

15 Claims, 6 Drawing Sheets

(56) References Cited

U.S. PATENT DOCUMENTS

2016/0344831 A1* 11/2016 Schneider ......... G06F 17/30861

OTHER PUBLICATIONS

Anonymous, "CookieManager," Android Developers, Sep. 11, 2014 [retrieved on Jul. 15, 2015]. Retrieved from the Internet: URL<http://developer.android.com/reference/android/webkit/CookieManager.html>, 7 pages.

Anonymous, "Setting a Cookie to a WebView using HttpClient and CookieManager," Stackoverflow Questions, Oct. 20, 2013 [retrieved on Jul. 15, 2015]. Retrieved from the Internet: URL<http://stackoverflow.com/questions/19479736/setting-a-cookie-to-a-webview-using-httpclient-and-cookiemanager>, 3 pages.

Anonymous, "setting Cookies in WebView android," Stackoverflow Questions, Mar. 22, 2011 [retrieved on Jul. 15, 2015]. Retrieved from the Internet: URL<http://stackoverflow.com/questions/5396965/setting-cookies-in-webview-android>, 2 pages.

Eshyu, "Syncing cookies between an HttpClient and a WebView," Wordpress Blog, Jun. 27, 2010 [retrieved on Jul. 15, 2015]. Retrieved from the Internet: URL<https://eshyu.wordpress.com/2010/06/27/syncing-cookies-between-an-httpclient-and-a-webview/>, 5 pages.

* cited by examiner

THIRD PARTY CUSTOMIZED CONTENT BASED ON FIRST PARTY IDENTIFER

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for providing content to a user device. A method includes: receiving, from a browser in association with rendering a first publisher page, a first content request for filling a slot on the first publisher page, the request including an encrypted publisher cookie; providing content responsive to the received request including a content item and a parameter that is associated with the encrypted publisher cookie; upon receipt of an indication that a user interacted with the content item, creating a content serving system cookie that is unique to the browser and providing the content serving system cookie responsive to the receipt of the indication of the interaction with the content item; linking the received encrypted publisher cookie with the content serving system cookie, including storing an association between the encrypted publisher cookie and the content serving system cookie in a data structure; receiving from the browser a second, different request for content in association with rendering a second, different publisher page, the second, different request including an encrypted publisher cookie associated with the second different publisher page and the previously provided content serving system cookie; after receiving the second different request, linking the received encrypted publisher cookie associated with the second, different publisher page with the encrypted publisher cookie associated with the first publisher page in the data structure; and using the linkings to determine content to deliver to the browser.

In general, another aspect of the subject matter described in this specification can be implemented in computer program products. A computer program product is tangibly embodied in a computer-readable storage device and comprises instructions. The instructions, when executed by a processor, cause the processor to: receive, from a browser in association with rendering a first publisher page, a first content request for filling a slot on the first publisher page, the request including an encrypted publisher cookie; provide content responsive to the received request including a content item and a parameter that is associated with the encrypted publisher cookie; upon receipt of an indication that a user interacted with the content item, create a content serving system cookie that is unique to the browser and providing the content serving system cookie responsive to the receipt of the indication of the interaction with the content item; link the received encrypted publisher cookie with the content serving system cookie, including storing an association between the encrypted publisher cookie and the content serving system cookie in a data structure; receive from the browser a second, different request for content in association with rendering a second, different publisher page, the second, different request including an encrypted publisher cookie associated with the second different publisher page and the previously provided content serving system cookie; after receiving the second different request, link the received encrypted publisher cookie associated with the second, different publisher page with the encrypted publisher cookie associated with the first publisher page in the data structure; and use the linkings to determine content to deliver to the browser.

In general, another aspect of the subject matter described in this specification can be implemented in systems. A system includes one or more processors and one or more memory elements including instructions. The instructions, when executed, cause the one or more processors to: receive, from a browser in association with rendering a first publisher page, a first content request for filling a slot on the first publisher page, the request including an encrypted publisher cookie; provide content responsive to the received request including a content item and a parameter that is associated with the encrypted publisher cookie; upon receipt of an indication that a user interacted with the content item, create a content serving system cookie that is unique to the browser and providing the content serving system cookie responsive to the receipt of the indication of the interaction with the content item; link the received encrypted publisher cookie with the content serving system cookie, including storing an association between the encrypted publisher cookie and the content serving system cookie in a data structure; receive from the browser a second, different request for content in association with rendering a second, different publisher page, the second, different request including an encrypted publisher cookie associated with the second different publisher page and the previously provided content serving system cookie; after receiving the second different request, link the received encrypted publisher cookie associated with the second, different publisher page with the encrypted publisher cookie associated with the first publisher page in the data structure; and use the linkings to determine content to deliver to the browser.

These and other implementations can each optionally include one or more of the following features. The received encrypted publisher cookie associated with the first publisher page can be one way encrypted such that an underlying publisher cookie of the first publisher page is not discoverable from the received encrypted publisher cookie associated with the first publisher page. Creating the content serving system cookie can include creating a first party cookie associated with the content serving system. Providing the content serving system cookie can include delivering an advertisement that is configured to direct the browser back to the content serving system prior to continuing on to a landing page associated with the advertisement. Upon interaction by the user associated with the browser with the advertisement, the content serving system cookie can be provided to the browser. An encrypted publisher cookie associated with a third, different publisher page can be linked with the encrypted publisher cookies of the first and second, different publisher pages. The linked encrypted publisher cookies can be associated with different domains. The linkings can further include linking historical interaction data associated with user interactions with a respective publisher page with a respective encrypted publisher cookie of the respective publisher page.

Using the linkings can include receiving a subsequent request for content in association with rendering one publisher page that is linked to another publisher page. The content serving system cookie and the encrypted publisher cookie of the linked publisher page can be received. Other information identifying other linked pages can be retrieved based on the linkings. The other information can include user interaction data associated with a respective linked publisher page. Using the linkings can include evaluating the interaction data, selecting content from inventory responsive to the subsequent request, and providing the selected content responsive to the subsequent request.

Particular implementations may realize none, one or more of the following advantages. Customized content can be provided to a user device when a browser of the user device is configured to block third party cookies. A publisher can opt-in or opt-out of providing encrypted publisher cookies for use in content selection for content to be presented on publisher pages. A publisher cookie can be one-way encrypted so that the underlying cookie is not discoverable from the encrypted publisher cookie associated with the publisher page.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A browser setting may be configured to block third party cookies. That is, a browser may be configured to not allow a cookie from a party other than an originating publisher in association with a request for an internet resource. For example, when a publisher page is rendered in the browser, the publisher page can be viewed as a first party and a cookie associated with the first party may be allowed to be stored on the requesting device. A content serving system that provides additional content for inclusion on a publisher resource (such as an advertisement for presentation in a slot on a publisher page) may be viewed as a third party. Traditionally, third party cookies can be blocked, such as by designating a preference in association with a conventional browser. An innovative method and device are disclosed that enables third party content providers, such as the content serving system, to recognize user devices and deliver customized content on publisher resources (e.g., pages) using cookies that are first party cookies with respect to the content serving system. The methods and devices can be used in association with browsers that have been configured to block third party cookies.

For situations in which the systems discussed here collect information about users, or may make use of information about users, the users may be provided with an opportunity to control whether programs or features collect user information (e.g., information about a user's social network, social actions or activities, profession, demographics, a user's preferences, or a user's current location), or to control whether and/or how to receive content from a content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
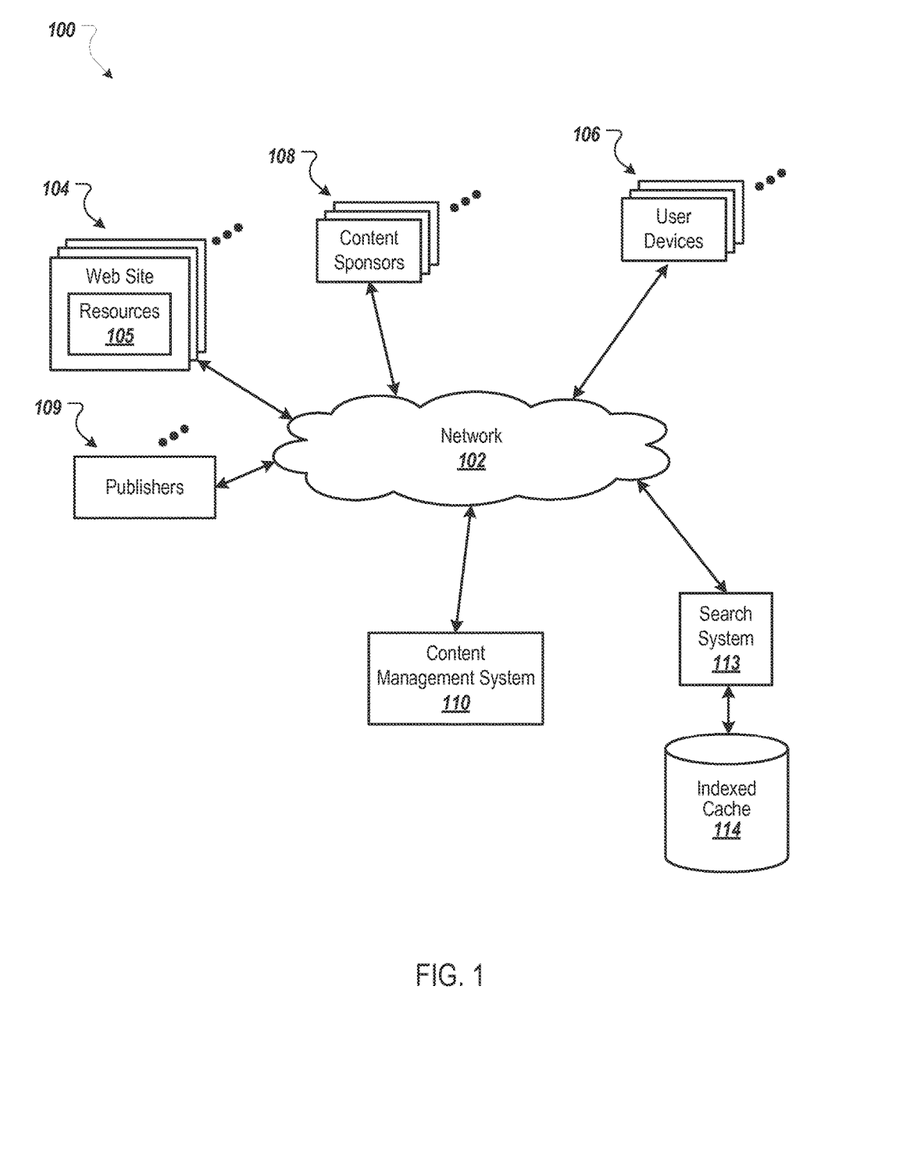
FIG. 1 is a block diagram of an example environment for providing content to a user device.

FIG. 1 is a block diagram of an example environment 100 for providing content to a user device. The example environment 100 includes a network 102, such as a local area network (LAN), a wide area network (WAN), the Internet, or a combination thereof. The network 102 connects websites 104, user devices 106, content sponsors 108, publishers 109 (including a first publisher 109a and a second publisher 109b), a content management system 110, and a search system 113. The example environment 100 may include many thousands of websites 104, user devices 106, content sponsors 108, and publishers 109. The content management system 110 may be used for selecting and providing content in response to requests for content. The content sponsors 108 can be, for example, advertisers. Other types of content sponsors are possible.

A content sponsor 108 can create a content campaign associated with one or more content items using tools provided by the content management system 110. For example, the content management system 110 can provide one or more account management user interfaces for creating and managing content campaigns. The account management user interfaces can be made available to the content sponsor 108, for example, either through an online interface provided by the content management system 110 or as an account management software application installed and executed locally or remotely in association with a content sponsor's client device.

A content sponsor 108 can, using the account management user interfaces, provide campaign parameters which define a content campaign. The content campaign can be created and activated for the content sponsor 108 according to the parameters specified by the content sponsor 108. Campaign parameters can include, for example, a campaign name, a preferred content network for placing content, a budget for the campaign, start and end dates for the campaign, a schedule for content placements, content (e.g., creatives), bids, and selection criteria. Selection criteria can include, for example, a language, one or more geographical locations or websites, and one or more selection terms.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, applications, and news feed sources, to name only a few. The resources 105 can include content, such as words, phrases, videos, images and sounds, that may include embedded information (such as meta-information hyperlinks) and/or embedded instructions (such as scripts). Resources can be provided by the publishers 109, for example. As another example, a content sponsor 108 can act as a content publisher and can be associated with a website 104, and with one or more resources 105 (e.g., web pages, applications, other resources).

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. User devices 106 can also submit search queries to the search system 113 over the network 102. In response to a search query, the search system 113 can, for example, access an indexed cache 114 to identify resources 105 that are relevant to the search query. The search system 113 identifies the resources 105 in the form of search results and returns the search results to the user devices 106 in search results pages. A search result is data generated by the search system 113 that identifies a resource 105 that is responsive to a particular search query, and can include a link to the resource 105. An example search result can include a web page title, a snippet of text or a portion of an image extracted from the web page, and the URL (Unified Resource Location) of the web page.

A search result or a resource 105 can be sent responsive to a request received from a user device 106. The search result or resource 105 can be sent with a request for the web browser of the user device 106 to set a Hypertext Transfer Protocol (HTTP) cookie. A cookie can represent, for example, a particular user device 106 and/or a particular web browser. For example, the search system 113 can include a server that replies to a search query by sending a search result in an HTTP response. Such an HTTP response can include instructions (e.g., a set cookie instruction) requesting the browser to store a cookie for the site hosted by the server.

In some implementations, each cookie can include content which specifies an initialization time that indicates a time at which the cookie was initially set on the particular user device 106. If the browser supports cookies and cookies are enabled, subsequent page requests to the same server can include the cookie for that server. Because HTTP is a stateless protocol, the use of cookies can allow an external service, such as the search system 113, the content management system 110, or other system, to track particular actions and status of a user over multiple sessions. The cookie can store a variety of data, and in some implementations, a unique or semi-unique identifier. In some implementations, the identifier can be anonymized so that the privacy of users is protected. For example, in some implementations, semi-unique identifiers are associated with users, but actual identifying information of the users is not stored in a cookie. Additionally, in some implementations any identified user interactions can be generalized rather than associated with a particular user. Encryption and obfuscation techniques can also be used to protect the privacy of users.

The data representing the resource 105 or the search results can also include data specifying a portion of the resource 105 or search results or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot. Content for inclusion in a slot can be provided by a third party that is not associated with an underlying requested resource.

When a resource 105 or search results are requested by a user device 106, the content management system 110 may receive a request for content to be provided with the resource 105 or search results. The request for content can include characteristics of one or more slots or impressions that are defined for the requested resource 105 or search results. For example, a reference (e.g., URL) to the resource 105 or search results for which the slot is defined, a size of the slot, and/or media types that are available for presentation in the slot can be provided to the content management system 110. Similarly, keywords associated with a requested resource 105 or a search query for which search results are requested can also be provided to the content management system 110 to facilitate identification of content that is relevant to the resource 105 or search query. An identifier (e.g., cookie) associated with the user device 106 can be received with the request for content.

Based, for example, on data included in the request for content, the content management system 110 can select content items that are eligible to be provided in response to the request. One or more selected content items 114 can be provided to the user device 106 in association with providing an associated resource 105 or search results. The provided content item(s) can be presented on the user device 106, in one or more respective slots.

In some implementations, the content management system 110 can select content items based at least in part on results of an auction. For example, content sponsors 108 can provide bids specifying amounts that the content sponsors 108 are respectively willing to pay for presentation of their content items. In turn, an auction can be performed and the slots can be allocated to content sponsors 108 according, among other things, to their bids and/or the relevance of a content item to content presented on a page hosting the slot or a request that is received for the content item. For example, when a slot is being allocated in an auction, the slot can be allocated to the content sponsor 108 that provided the highest bid or a highest auction score (e.g., a score that is computed as a function of a bid and/or a quality measure). When multiple slots are allocated in a single auction, the slots can be allocated to a set of bidders that provided the highest bids or have the highest auction scores.

A browser executing on a user device 106 may be configured to block third party cookies. A third party can be distinguished, for example, from a first party. When a resource 105 associated with a publisher 109 is rendered in the browser on the user device 106, the publisher 109 (e.g., a domain associated with the publisher 109) can be considered as the first party. As mentioned above, the resource 105 can include one or more content slots and each of the content slots can be configured to include instructions which request content for a respective content slot from the content management system 110. The content management system 110 can be considered as a third party in this example.

A method is proposed, which is described in detail below, that enables the content management system 110 to deliver customized content to be included in the content slot(s) included in the resource 105 associated with the publisher 109, using cookies that are first party cookies with respect to the content management system 110. The method, which involves encrypted publisher cookies, can be used with browsers that have been configured to block third party cookies.

Figure 2:
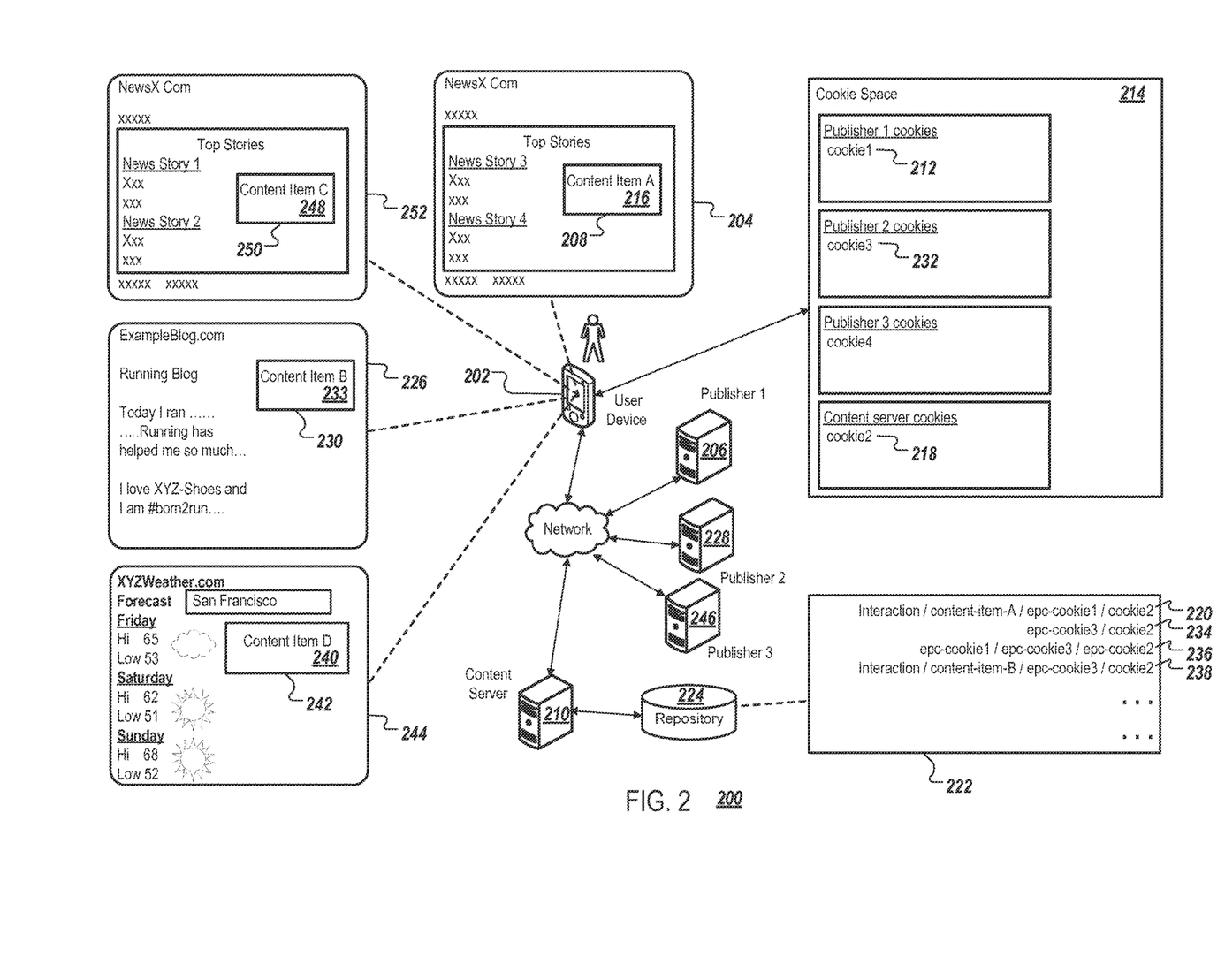
FIG. 2 is a block diagram of an example system for providing content to a user device.

FIG. 2 is a block diagram of an example system 200 for providing content to a user device 202. A "NewsX.com" publisher page 204 associated with a publisher 206 is rendered in a browser running on the user device 202. The publisher page 204 includes in this example one or more content slots, such as including a content slot 208. The content slot 208 can include or be associated with a script which, when executed, causes the browser to send a request to a content server 210 for content to present in the content slot 208. The script can, when executed, cause the browser to identify and include an encrypted publisher cookie with the request for content that is sent to the content management system 110 (e.g., for identifying content for inclusion in the content slot 208).

For example, the publisher 206 can, when providing the publisher page 204, drop a publisher cookie 212 associated with the publisher 206 into a cookie space 214 of the browser. The publisher cookie 212 can include an identifier that is unique to the browser and can be associated with a domain associated with the publisher 206. The publisher cookie 212 can include content which specifies an initialization time that indicates a time at which the publisher cookie 212 was initially set on the user device 202. Subsequent page requests from the user device 202 to the publisher 206 can include the publisher cookie 212. The publisher cookie 212 can allow the publisher 206 to track particular actions and status of a user over multiple sessions. The publisher cookie 212 can store a variety of data, such as past session data.

The publisher 206, or a script associated with the publisher page 204 or the content slot 208, can generate an encrypted publisher cookie that is based on the publisher cookie 212. The encrypted publisher cookie that is based on the publisher cookie 212 can be generated, for example, using a SHA512 hash function with the publisher cookie 212 as an input parameter. Other hash function or encryption techniques can be used. The encrypted publisher cookie associated with the publisher cookie 212 can be included in the request sent by the browser to the content server 210 for content to be included in the content slot 208.

The content server 210 can receive the request for content for the content slot 208 from the browser running on the user device 202. The content server 210 selects a content item for the content slot 208, such as based at least in part on the content of the publisher page 204. The content server 210 provides the selected content item to the browser, for presentation in the content slot 208, as illustrated by a content item 216 (e.g., "content item A"). The content server 210 can configure the content item 216 to be associated with the encrypted publisher cookie associated with the publisher cookie 212.

For example, the content item 216 can be configured to include a script which is executed in response to a user interaction with (e.g., selection of) the content item 216 and which requests the browser to execute a navigation request to navigate to a website associated with the content server 210 (e.g., the website can have a same domain as a domain associated with the content server 210). The navigation request, which can be, e.g., a URL, can include the encrypted publisher cookie associated with the publisher cookie 212. In response to user interaction with the content item 216, the content server 210 can receive the navigation request from the browser, the navigation request including an indication of the user interaction with the content item 216 and the encrypted publisher cookie associated with the publisher cookie 212.

In response to receiving the navigation request from the browser, the content server 210 can create a content server cookie (e.g., a cookie with a same domain as a domain of the content server 210) that will be treated as a first party cookie by the browser (since the browser issued the navigation request). The content server cookie can be included in a response sent to the browser that is responsive to the navigation request sent by the browser to the content server 210. The response can include an instruction to the browser to drop the content server cookie as a content server cookie 218 in the cookie space 214 of the browser. The browser can accept and perform the drop cookie instruction, even when the browser has blocked third party cookies, because the content server cookie 218 is a first party cookie (e.g., the browser is associated with the domain of the content server 210 due to the navigation request sent by the browser to the content server 210). The response sent by the content server 210 to the browser can include a redirect request to cause the browser to load, for example, a landing page associated with the content item 216.

In some implementations, in response to receiving the navigation request from the browser, the content server 210 can link the generated content server cookie with the received encrypted publisher cookie associated with the publisher cookie 212. For example, an entry 220 of a data structure 222 stored in a repository 224 can be made to include both the content server cookie (e.g., "cookie2") and the encrypted publisher cookie associated with the publisher cookie 212 (e.g., "epc-cookie1"). The entry 220 can include other information, such as an indication of the type of interaction that occurred with the content item 216, an identifier for the content item 216, a date and time at which the interaction occurred, location information indicating the location of the user device 202 at the time of the interaction, and other information. The other information can be used, for example, for selecting content in response to subsequent requests for content that are associated with the content server cookie.

At a time subsequent to the displaying of the landing page associated with the content item 216 in the browser, the user of the user device 202 may navigate to a publisher page 226 associated with a publisher 228, causing the publisher page 226 to be presented in the browser. The publisher page 226 includes a content slot 230. The content slot 230 can include a script which, when executed, causes the browser to send a request to the content server 210 for content to present in the content slot 230. The script can, when executed, cause the browser to include an encrypted publisher cookie associated with the publisher 228 with the request for content for the content slot 230.

For example, the publisher 228 can, when providing the publisher page 226, drop a publisher cookie 232 associated with the publisher 228 into the cookie space 214 of the browser. The publisher 228, or a script associated with the publisher page 226 or the content slot 230, can generate an encrypted publisher cookie that is based on the publisher cookie 232. The encrypted publisher cookie that is based on the publisher cookie 232 can be generated similar to the encrypted publisher cookie discussed above. The encrypted publisher cookie associated with the publisher cookie 232 can be included in the request sent by the browser to the content server 210 for content for the content slot 230.

Because the content server cookie 218 was previously dropped into the cookie space 214 of the browser, the content server cookie 218 is automatically included by the browser in the request sent by the browser to the content server 210 for content for the content slot 230. In some implementations, the content server cookie 212 includes information related to user interactions with the content item 216 or other content items provided by the content server 210 and/or information related to content items provided to the user device 202 by the content server 210.

The content server 210 can receive the request for content for the content slot 230 from the browser running on the user device 202. The content server 210 can extract the content server cookie 218 and the encrypted publisher cookie associated with the publisher cookie 232 from the request. The content server 210 can identify the entry 220 as being associated with the request (e.g., by querying the data structure 222 for entries that include the content server cookie 218). The content server 210 can evaluate the entry 220 and can select content for the content slot 230 based at least in part on the evaluating of the entry 220. Evaluating the entry is discussed in greater detail below.

Evaluating the entry 220 can include identifying data in one or more fields of the respective entry and using the identified data to assist in the selection of content to deliver in response to the received request. For example, the content server 220 can identify the interaction indication and the identifier of the content item 216 in the entry 220. The content server 210 can, for example, locate keywords or topics associated with the content item 216 and can select a content item for the content slot 230 based at least in part on the located keywords or topics associated with the content item 216. The content server 210 can select a content item for the content slot 230 based on keywords or topics associated with the content item 216 because the user's prior interaction with the content item 216 may mean that the user may be interested in other content items which have similar keywords or topics as the content item 216. The content server 210 provides the selected content item to the browser, for presentation in the content slot 230, as illustrated by a content item 233 (e.g., "content item B") responsive to the received request. The content server 210 can configure the content item 233 to be associated with the encrypted publisher cookie associated with the publisher cookie 232, e.g., as described above for the content item 216.

For example, the content item 233 can be configured to include a script which is executed in response to a user interaction with (e.g., selection of) the content item 233 and which requests the browser to execute a navigation request to navigate to a website associated with the content server 210 (e.g., the website can have a same domain as a domain associated with the content server 210). The navigation request, which can be, e.g., a URL, can include the encrypted publisher cookie associated with the publisher cookie 232.

The content server 210 can link the content server cookie 218 with the encrypted publisher cookie associated with the publisher cookie 232. For example, a mapping entry 234 can be added to the data structure 222 which includes the content server cookie 218 (e.g., "cookie2") and the encrypted publisher cookie associated with the publisher cookie 232 (e.g., "epc-cookie3"). The content server 210 can also link the encrypted publisher cookie associated with the publisher cookie 232 with the encrypted publisher cookie associated with the publisher cookie 212. The two encrypted publisher cookies can be indirectly and/or directly linked in the data structure 222, for example. For instance, the encrypted publisher cookie associated with the publisher cookie 232 can be indirectly linked to the encrypted publisher cookie associated with the publisher cookie 212 based on both the entries 220 and 234 including the content server cookie 218. Accordingly, a search of the data structure 222 can locate all such entries that are "indirectly" linked. As another example, the encrypted publisher cookie associated with the publisher cookie 232 can be directly linked to the encrypted publisher cookie associated with the publisher cookie 212 by creating a single entry for inclusion (e.g., an entry 236) in the data structure 222 which includes the encrypted publisher cookie associated with the publisher cookie 232, the encrypted publisher cookie associated with the publisher cookie 212, and the content server cookie 218.

The user of the user device 202 can interact with the content item 233, and in response to the interaction, processing can be performed (e.g., by the browser and the content server 210) that is similar to the processing occurring in response to the interaction with the content item 216. For example, an entry 238 can be stored in the data structure 222. The entry 238 includes the content server cookie (e.g., "cookie2") and the encrypted publisher cookie associated with the publisher cookie 232 (e.g., "epc-cookie3"). The entry 238 can include other information, such as an indication of the type of interaction that occurred with the content item 233, an identifier for the content item 233, a date and time at which the interaction occurred, location information indicating the location of the user device 202 at the time of the interaction, and other information.

Information in the entries 220 and 238 (and possibly other entries) can be used to select content in response to subsequent requests for content from the user device 202 which include the content server cookie. For example, the information in the entries 220 and 238 can be used to select a content item 240 for a content slot 242 included in a publisher page 244 provided by a publisher 246. As another example, the information in the entries 220 and 238 can be used to select a content item 248 for a content slot 250 included in a second presentation on the user device 202 of the "NewsX.com" publisher page (e.g., publisher page 252) provided by the publisher 206.

Figure 3:
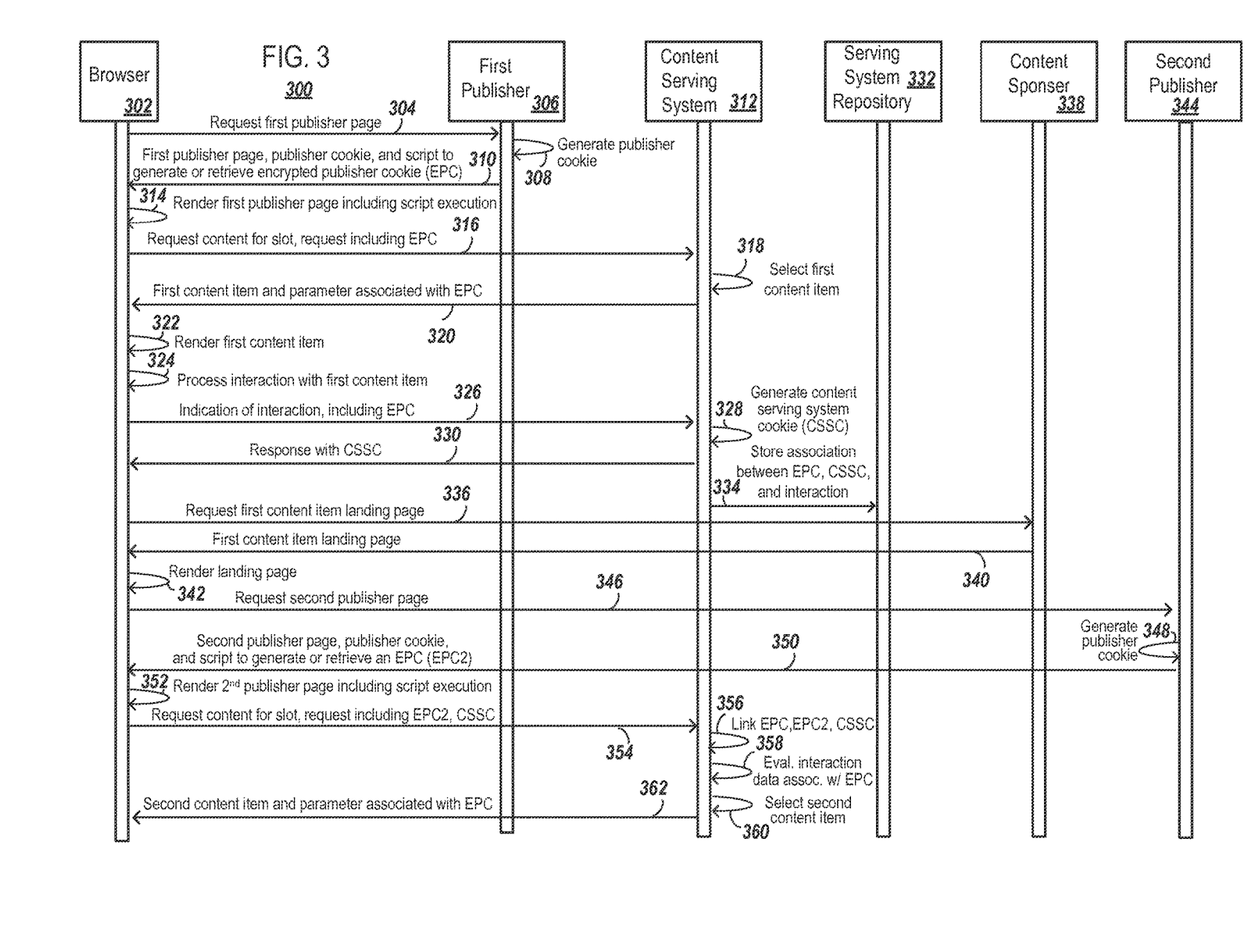
FIG. 3 is a diagram of an example process for providing content to a user device.

FIG. 3 is a diagram of an example process 300 for providing content to a user device. A browser 302 (e.g., web browser) sends a request 304 to a first publisher 306 for a publisher page associated with the first publisher 306. The first publisher 306 generates a publisher cookie (308). The first publisher 306 provides, in response to the request 304, the first publisher page, the publisher cookie, and a script to generate or retrieve an encrypted publisher cookie (EPC) associated with the publisher cookie (310). The script can be associated with a content slot included in the first publisher page. The content slot can be configured (e.g., by execution of a script that places a call to the content serving system 312) to present content provided by the content serving system 312.

The script, for example, can be configured to generate the EPC based on the provided publisher cookie. As another example, the first publisher 306 can generate the EPC based on the publisher cookie and can provide the EPC along with (or instead of) the publisher cookie (e.g., at 310), and the script can be configured to retrieve the provided EPC. As yet another example, the first publisher 306 can provide the publisher cookie and the EPC (or, in some implementations, just the EPC) in association with browser cookies that are to be dropped into a cookie space associated with the browser 302.

The browser 302 renders the received first publisher page (314). As part of rendering the first publisher page, the browser 302 executes the script provided by the first publisher 306. The script generates or retrieves the EPC and sends a request 316 to the content serving system 312 for content for the content slot. The request 316 includes the EPC. The content serving system 312 selects a content item (e.g., a first content item) in response to the request 316 (318) and provides the first content item and a parameter associated with the EPC (e.g., script code) to the browser 302 (320). For example, the first content item can include instructions which can be executed on the browser 302 in response to user interaction with the first content item. The instructions can be configured to send an interaction indication that includes the EPC (or, in some implementations, an encrypted version of the EPC) to the content serving system 312.

The browser 302 renders the received first content item in the content slot included in the first publisher page (322). Subsequent to the rendering of the first content item, the browser 302 receives an indication of and processes an interaction with (e.g., selection of) the first content item (324). For example, the user of the browser can select the first content item. The browser 302 sends an interaction indication 326 of the interaction to the content serving system 312. The indication 326 includes the EPC. For example, the first content item can be configured to retrieve (or regenerate) the EPC and include the EPC in the indication 326, in response to an interaction with the first content item.

In response to receiving the interaction indication 326, the content serving system 312 generates a content serving system cookie (CSSC) (328). The CSSC can be associated with the domain of the content serving system 312. The content serving system 312 generates and sends a response 330 to the browser 302, the response 330 including the CSSC and a drop cookie instruction to drop the CSSC into a cookie space associated with the browser 302. In response to receiving the response 330, the browser 302 can store the CSSC in the cookie space associated with the browser 302. The content serving system 312 stores an association between the EPC, the CSSC, and the interaction indication 326 in a content serving system repository 332 (334). In some implementations, the content serving system 312 stores the association between the EPC, the CSSC, and the interaction indication 326 before generating and sending the response 330.

As part of processing the interaction with the first content item, the browser 302 sends a request 336 to a content sponsor 338 for a landing page associated with the first content item. The content sponsor 338 provides the landing page 340 (or a redirect for the landing page 340) in response to the request 336. The browser 302 renders the received landing page (342).

At a time after the landing page is rendered, the browser 302 requests a second publisher page from a second publisher 344 (346) (e.g., in response to a user entering a URL of the second publisher page into the browser 302 or selecting a link associated with the second publisher page). The second publisher 344 generates a publisher cookie associated with the second publisher (348). The second publisher 344 provides the second publisher page, the publisher cookie, and a script to generate or retrieve an encrypted publisher cookie (EPC2) associated with the publisher cookie associated with the second publisher (350). The script can be associated with a content slot included in the second publisher page. The content slot can be for presenting content provided by a content serving system 312.

The script, for example, can be configured to generate the EPC2 based on the provided publisher cookie associated with the second publisher. As another example, the second publisher 344 can generate the EPC2 based on the publisher cookie associated with the second publisher and can provide the EPC2 along with (or instead of) the publisher cookie (e.g., at 350), and the script can be configured to retrieve the provided EPC2. As yet another example, the second publisher 344 can provide the publisher cookie and the EPC2 (or, in some implementations, just the EPC2) as browser cookies that are to be dropped into a cookie space associated with the browser 302.

The browser 302 renders the second publisher page (352). As part of rendering the second publisher page, the browser 302 executes the script provided by the second publisher 344. The script generates or retrieves the EPC2 and sends a request 354 to the content serving system 312 for content for the content slot included in the second publisher page. The request 354 includes the EPC2 and the previously stored CSSC (e.g., the CSSC can be automatically included in the request 354 due to the request 354 being associated with the domain of the content serving system 312).

In response to receiving the request 354 that includes the CSSC and the EPC2, the content serving system 312 can link the CSSC, the EPC2 associated with the second publisher 344, and the EPC associated with the first publisher 306 (356). For example, the content serving system can identify the CSSC included in the request 354 and can use the CSSC to locate, in the content serving system repository 332, the previously stored association between the EPC and the CSSC. The content serving system 312 can link the EPC2 included in the request 354 to the EPC (e.g., since both are linked to the CSSC). In some implementations, the content serving system 312 stores an association between the EPC, the CSSC, and the EPC2 in the content serving system repository 332.

The content serving system 312 can, in response to the request 354 for content for the slot included in the second publisher page 350, evaluate, for example, stored interaction data associated with one or more of the EPC, the EPC2, and the CSSC (358). For example, the content serving system 312 can select a second content item based, at least in part, on interaction data previously stored in association with the EPC associated with the first publisher (360). The content serving system 312 can provide the selected second content item (and in some implementations, a parameter associated with the EPC), to the browser 302, for presentation in the content slot included in the second publisher page (362).

Similar to the processing of the interaction with the first content item on the first publisher page, the content serving system 312 can store interaction information associated with an interaction with the second content item in response to receiving an indication of an interaction with the second content item. The content serving system 312 can select content for future content requests based on the interaction with the second content item, the interaction with the first content item, and/or on other data associated with the CSSC.

Figure 4A:
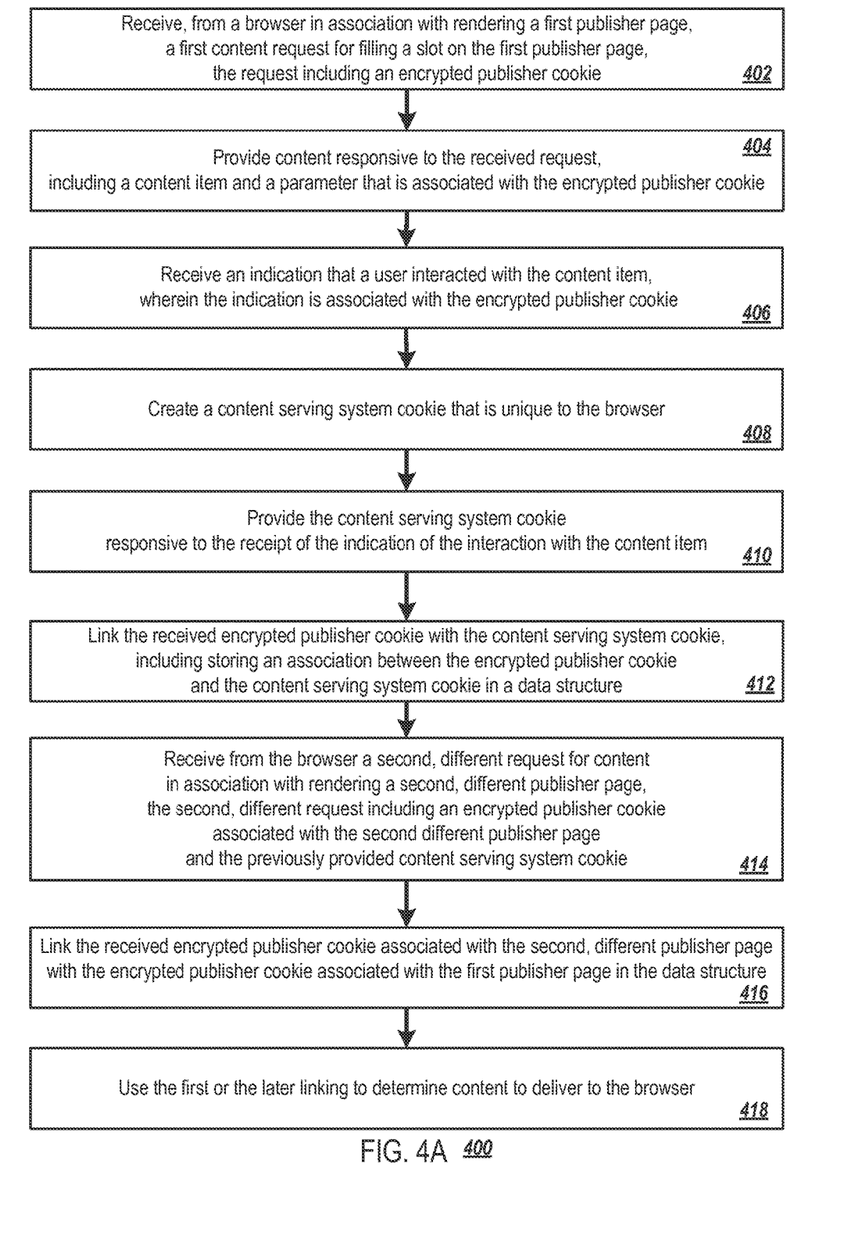
FIGS. 4A and 4B are flowcharts of an example processes for providing content to a user device.

FIG. 4A is a flowchart of an example process 400 for providing content to a user device. The process 400 can be performed, for example, by the content management system 110 described above with respect to FIG. 1, the content server 210 described above with respect to FIG. 2, or the content serving system 312 described above with respect to FIG. 3.

A first content request for filling a slot on a first publisher page is received from a browser in association with rendering the first publisher page (402). The first content request includes an encrypted publisher cookie. The received encrypted publisher cookie associated with the first publisher page can be one way encrypted such that an underlying publisher cookie of the first publisher page is not discoverable from the received encrypted publisher cookie associated with the first publisher page. The received encrypted publisher cookie can be encrypted, for example, using the SHA512 hash function.

Content is provided responsive to the received request including a content item and a parameter that is associated with the encrypted publisher cookie (404). For example, the parameter can include instructions which can be executed on the browser in response to user interaction with the content item. The instructions can be configured to send an interaction indication that includes the encrypted publisher cookie (or, in some implementations, an encrypted version of the encrypted publisher cookie) to the content serving system.

An indication that a user interacted with the content item is received (406), wherein the indication is associated with the encrypted publisher cookie. Responsive to the receipt of the indication of the interaction with the content item, a content serving system cookie that is unique to the browser is created (408). For example, a cookie that is a first party cookie associated with (e.g., with respect to) the content serving system can be created. For example, the content serving system cookie can have a same domain as a domain of the content serving system. The content serving system cookie is provided to the browser (410).

Also responsive to the receipt of the interaction indication, the received encrypted publisher cookie is linked with the content serving system cookie (412), including the storing of an association between the encrypted publisher cookie and the content serving system cookie in a data structure. Information associated with the interaction indication can be stored in association with the encrypted publisher cookie and the content serving system cookie. For example, context information associated with the interaction (e.g., time, location) can be stored. As another example, an identifier of the content item can be stored.

A second, different request for content is received from the browser in association with rendering a second, different publisher page (414). The second, different request includes an encrypted publisher cookie associated with the second, different publisher page and the previously provided content serving system cookie. The encrypted publisher cookie associated with the second, different publisher page can be associated with a different domain than the encrypted publisher cookie associated with the first publisher page. The encrypted publisher cookie associated with the second publisher page can be one way encrypted such that an underlying publisher cookie of the second publisher page is not discoverable from the received encrypted publisher cookie associated with the second publisher page.

After receiving the second different request, the received encrypted publisher cookie associated with the second, different publisher page is linked with the encrypted publisher cookie associated with the first publisher page in the data structure (416). For example, a determination can be made that both the encrypted publisher cookie associated with the second, different publisher page and the encrypted publisher cookie associated with the first publisher page are both associated with the content serving system cookie. The linking of the encrypted publisher cookie associated with the second, different publisher page with the encrypted publisher cookie associated with the first publisher page can include linking historical interaction data associated with user interaction data for a respective publisher page with a respective encrypted publisher cookie of the respective publisher page.

The linkings are used to determine content to deliver to the browser (418). For example, the linkings can be used to select content for the second, different request for content and/or for subsequent requests for content that include the content serving system cookie.

Figure 4B:
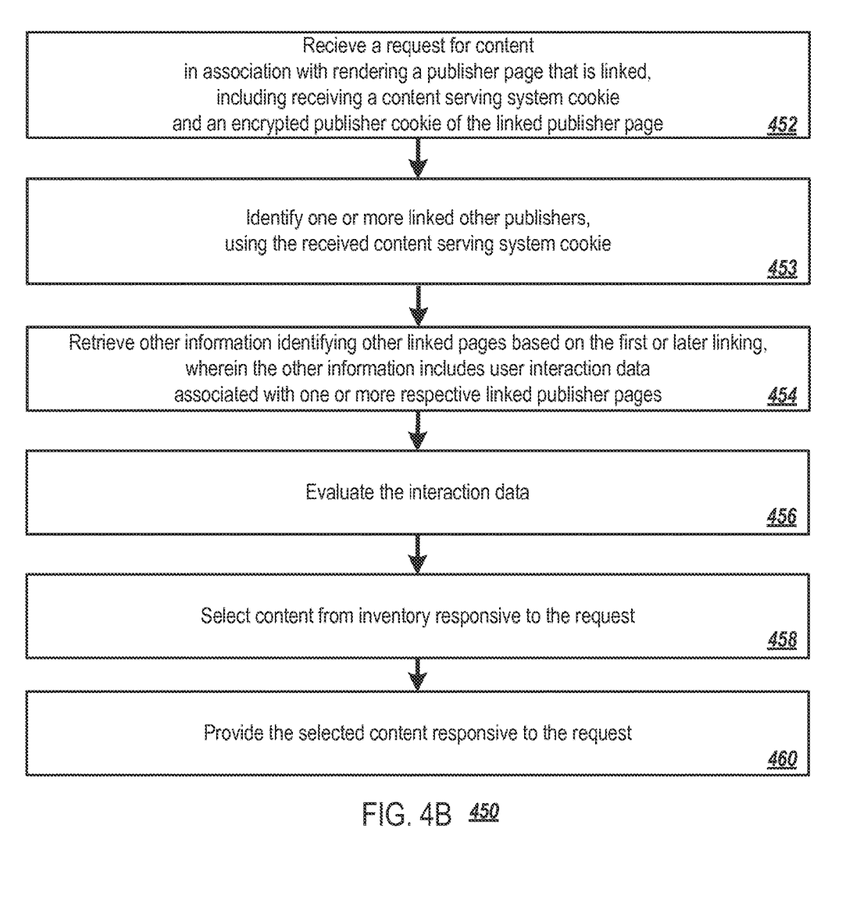

As another example and in more detail, FIG. 4B is a flowchart of an example process 450 for providing content to a user device. The process 400 can be performed, for example, by the content management system 110 described above with respect to FIG. 1, the content server 210 described above with respect to FIG. 2, or the content serving system 312 described above with respect to FIG. 3. The process 450 can be a continuation of the process 400 described above with respect to FIG. 4A.

A request for content is received in association with rendering a publisher page that is linked to one or more other different publisher pages through a commonly shared content serving system identifier, including the receiving of a content serving system cookie and an encrypted publisher cookie of the linked publisher page (452). For example, the request for content can be for a content slot included in the first publisher page, the second, different publisher page, or a third, also different publisher page. The request for content can be received, for example, from a browser.

One or more linked other publishers can be identified, using the received content serving system cookie (453). Information is retrieved based on the identified one or more other linked publishers, wherein the other information includes user interaction data associated with one or more respective linked publisher pages (454).

The interaction data associated with each of the respective linked publisher page(s) is evaluated (456). For example, for each respective linked publisher page, one or more of a time of day, time of year, location, or keywords associated with the content item with which the interaction occurred can be identified.

Content is selected from inventory responsive to the request (458). For example, one or more content items can be selected based at least in part on information identified during evaluation of the interaction data associated with each of the respective linked publisher pages.

The selected content is provided responsive to the request (460). For example, the selected one or more content items can be provided to the browser.

Figure 5:
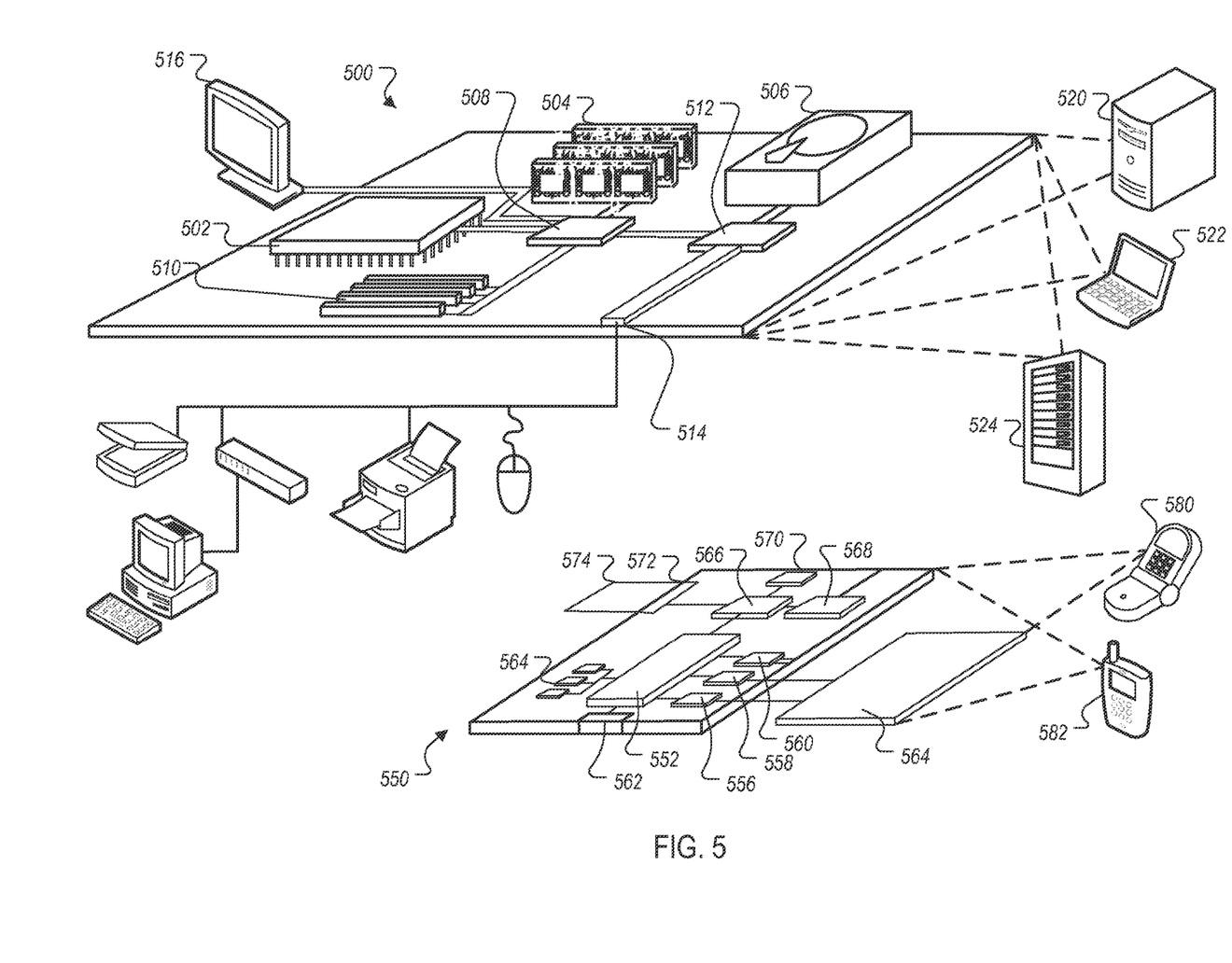
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. The computer-readable medium is not a propagating signal. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is illustrative only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:

receiving, at one or more servers and from a browser that is rendering a first publisher page of a first publisher, a first content request for filling a slot on the first publisher page while presented by the browser, wherein:

the request includes a first encrypted publisher cookie;

the browser is configured to block third party cookies that are of a different domain than a domain of the first publisher page while the first publisher page is presented by the browser; and the first encrypted publisher cookie being an encrypted form of a publisher cookie that is a first party cookie with respect to the first publisher;

providing content responsive to the received request including a first content item and a script that, upon interaction with the first content item, causes the browser to send an interaction indication to the server that includes the first encrypted publisher cookie;

receiving the interaction indication that indicates that a user has interacted with the first content item on the first publisher page of the first publisher while presented by the browser, the interaction indication including the encrypted publisher cookie;

creating, in response to receiving the interaction indication, a content serving system cookie that is unique to the browser and that is a first party cookie with respect to a domain of the server and that is a third party cookie with respect to the domain of the first publisher;

providing, by the one or more servers, the content serving system cookie to the browser responsive to the receipt of the interaction indication;

generating, by the one or more servers, a first mapping in a data structure that links the received first encrypted publisher cookie, the interaction indication, and the content serving system cookie;

receiving a second different request for content generated by the browser during rendering of a second different publisher page of a second different publisher, the second different request including:
  a second encrypted publisher cookie that is a first party cookie with respect to the second different publisher; and
  the previously provided content serving system cookie, wherein the second different publisher page is from a different domain than the first publisher page;

after receiving the second different request, generating, by the one or more servers, a second mapping in the data structure that links the received second encrypted publisher cookie with the first encrypted publisher cookie and the content serving system cookie in the data structure;

based on the second different request including the content serving system cookie, identifying, in the data structure, mappings that include the content serving system cookie;

determining that the first mapping is included in the identified mappings;

evaluating the first mapping, including identifying, from the first mapping, the interaction indication that indicates that the user previously interacted with the first content item presented on the first publisher page of the first publisher;

using the interaction indication from the first mapping to select a second content item for the second different request that was generated during rendering of the second different publisher page; and delivering, by the one or more servers, the second content item to the browser in response to the second different request for presentation in the second different publisher page of the second different publisher.

2. The method of claim 1 wherein the received first encrypted publisher cookie is one way encrypted such that an underlying publisher cookie of the first publisher page is not discoverable from the received first encrypted publisher cookie.

3. The method of claim 1 wherein providing the content serving system cookie includes delivering an advertisement that is configured to direct the browser back to the content serving system prior to continuing on to a landing page associated with the advertisement, and wherein upon interaction by the user associated with the browser with the advertisement, providing the content serving system cookie to the browser.

4. The method of claim 1 further comprising linking a third encrypted publisher cookie associated with a third different publisher page with the first and second encrypted publisher cookies of the first and second different publisher pages.

5. The method of claim 1 wherein the linked encrypted publisher cookies are associated with different domains.

6. A system comprising:
one or more processors; and
one or more memory elements including instructions that when executed cause the one or more processors to:
  receive, at one or more servers and from a browser that is rendering a first publisher page of a first publisher, a first content request for filling a slot on the first publisher page while presented by the browser, wherein:
  the request includes a first encrypted publisher cookie;
  the browser is configured to block third party cookies that are of a different domain than a domain of the first publisher page while the first publisher page is presented by the browser; and
  the first encrypted publisher cookie being an encrypted form of a publisher cookie that is a first party cookie with respect to the first publisher;
  provide content responsive to the received request including a first content item and a script that, upon interaction with the first content item, causes the browser to send an interaction indication to the server that includes the first encrypted publisher cookie;
  receive the interaction indication that indicates that a user has interacted with the first content item on the first publisher page of the first publisher while presented by the browser, the interaction indication including the encrypted publisher cookie;
  create, in response to receiving the interaction indication, a content serving system cookie that is unique to the browser and that is a first party cookie with respect to a domain of the server and that is a third party cookie with respect to the domain of the first publisher;
  provide, by the one or more servers, the content serving system cookie to the browser responsive to the receipt of the interaction indication;
  generate, by the one or more servers, a first mapping in a data structure that links the received first encrypted publisher cookie, the interaction indication, and the content serving system cookie;
  receive a second different request for content generated by the browser during rendering of a second different publisher page of a second different publisher, the second different request including:
  a second encrypted publisher cookie that is a first party cookie with respect to the second different publisher; and
  the previously provided content serving system cookie, wherein the second different publisher page is from a different domain than the first publisher page;
  after receiving the second different request, generate, by the one or more servers, a second mapping in the data structure that links the received second encrypted publisher cookie with the first encrypted publisher cookie and the content serving system cookie in the data structure;
  based on the second different request including the content serving system cookie, identify, in the data structure, mappings that include the content serving system cookie;

determine that the first mapping is included in the identified mappings;
evaluate the first mapping, including identifying, from the first mapping, the interaction indication that indicates that the user previously interacted with the first content item presented on the first publisher page of the first publisher;
use the interaction indication from the first mapping to select a second content item for the second different request that was generated during rendering of the second different publisher page; and
deliver, by the one or more servers, the second content item to the browser in response to the second different request for presentation in the second different publisher page of the second different publisher.

7. The system of claim 6 wherein the received first encrypted publisher cookie is one way encrypted such that an underlying publisher cookie of the first publisher page is not discoverable from the received first encrypted publisher cookie.

8. The system of claim 6 wherein providing the content serving system cookie includes delivering an advertisement that is configured to direct the browser back to the content serving system prior to continuing on to a landing page associated with the advertisement, and wherein upon interaction by the user associated with the browser with the advertisement, providing the content serving system cookie to the browser.

9. The system of claim 6, wherein the instructions when executed cause the one or more processors to link a third encrypted publisher cookie associated with a third different publisher page with the first and second encrypted publisher cookies of the first and second different publisher pages.

10. The system of claim 6 wherein the linked encrypted publisher cookies are associated with different domains.

11. A computer program product tangibly embodied in a computer-readable storage device and comprising instructions that, when executed by a processor, cause the processor to:
receive, at one or more servers and from a browser that is rendering a first publisher page of a first publisher, a first content request for filling a slot on the first publisher page while presented by the browser, wherein:
the request includes a first encrypted publisher cookie;
the browser is configured to block third party cookies that are of a different domain than a domain of the first publisher page while the first publisher page is presented by the browser; and
the first encrypted publisher cookie being an encrypted form of a publisher cookie that is a first party cookie with respect to the first publisher;
provide content responsive to the received request including a first content item and a script that, upon interaction with the first content item, causes the browser to send an interaction indication to the server that includes the first encrypted publisher cookie;
receive the interaction indication that indicates that a user has interacted with the first content item on the first publisher page of the first publisher while presented by the browser, the interaction indication including the encrypted publisher cookie;
create, in response to receiving the interaction indication, a content serving system cookie that is unique to the browser and that is a first party cookie with respect to a domain of the server and that is a third party cookie with respect to the domain of the first publisher;
provide, by the one or more servers, the content serving system cookie to the browser responsive to the receipt of the interaction indication;
generate, by the one or more servers, a first mapping in a data structure that links the received first encrypted publisher cookie, the interaction indication, and the content serving system cookie;
receive a second different request for content generated by the browser during rendering of a second different publisher page of a second different publisher, the second different request including:
a second encrypted publisher cookie that is a first party cookie with respect to the second different publisher; and
the previously provided content serving system cookie, wherein the second different publisher page is from a different domain than the first publisher page;
after receiving the second different request, generate, by the one or more servers, a second mapping in the data structure that links the received second encrypted publisher cookie with the first encrypted publisher cookie and the content serving system cookie in the data structure;
based on the second different request including the content serving system cookie, identify, in the data structure, mappings that include the content serving system cookie;
determine that the first mapping is included in the identified mappings;
evaluate the first mapping, including identifying, from the first mapping, the interaction indication that indicates that the user previously interacted with the first content item presented on the first publisher page of the first publisher;
use the interaction indication from the first mapping to select a second content item for the second different request that was generated during rendering of the second different publisher page; and
deliver, by the one or more servers, the second content item to the browser in response to the second different request for presentation in the second different publisher page of the second different publisher.

12. The product of claim 11 wherein the received first encrypted publisher cookie is one way encrypted such that an underlying publisher cookie of the first publisher page is not discoverable from the received first encrypted publisher cookie.

13. The product of claim 11 wherein providing the content serving system cookie includes delivering an advertisement that is configured to direct the browser back to the content serving system prior to continuing on to a landing page associated with the advertisement, and wherein upon interaction by the user associated with the browser with the advertisement, providing the content serving system cookie to the browser.

14. The product of claim 11, wherein the instructions when executed cause the one or more processors to link a third encrypted publisher cookie associated with a third different publisher page with the first and second encrypted publisher cookies of the first and second different publisher pages.

15. The product of claim 11 wherein the linked encrypted publisher cookies are associated with different domains.

* * * * *

UNITED STATES PATENT AND TRADEMARK OFFICE
CERTIFICATE OF CORRECTION

PATENT NO. : 10,387,923 B2
APPLICATION NO. : 14/626031
DATED : August 20, 2019
INVENTOR(S) : Wang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 626 days.

Signed and Sealed this
Second Day of June, 2020

Andrei Iancu
*Director of the United States Patent and Trademark Office*